(12) United States Patent
Felgen

(10) Patent No.: US 6,748,781 B2
(45) Date of Patent: Jun. 15, 2004

(54) DEVICE FOR PRODUCING METAL FIBERS

(75) Inventor: Fernand Felgen, Mersch (LU)

(73) Assignee: Trifilarbed Bissen S.A., Bissen (LU)

( * ) Notice: Subject to any disclaimer, the term of this patent is extended or adjusted under 35 U.S.C. 154(b) by 0 days.

(21) Appl. No.: 10/203,777

(22) PCT Filed: Feb. 16, 2001

(86) PCT No.: PCT/EP01/01756

§ 371 (c)(1),
(2), (4) Date: Aug. 13, 2002

(87) PCT Pub. No.: WO01/66279

PCT Pub. Date: Sep. 13, 2001

(65) Prior Publication Data

US 2003/0010081 A1 Jan. 16, 2003

(30) Foreign Application Priority Data

Mar. 9, 2000 (LU) .................................................. 90540

(51) Int. Cl.⁷ .................................................. B21H 8/00
(52) U.S. Cl. ........................................... 72/185; 72/187
(58) Field of Search ........................... 72/185, 186, 187

(56) References Cited

U.S. PATENT DOCUMENTS

| | | | | |
|---|---|---|---|---|
| 308,452 A | * | 11/1884 | Wright | ........................ 72/186 |
| 2,269,899 A | * | 1/1942 | Brandt | ........................ 72/187 |
| 3,146,803 A | * | 9/1964 | Creighton, Jr. | ............. 140/105 |
| 4,210,009 A | * | 7/1980 | Farfor et al. | ................... 72/186 |
| 4,960,649 A | * | 10/1990 | Takata et al. | ................ 428/574 |
| 5,215,830 A | | 6/1993 | Cinti | |

FOREIGN PATENT DOCUMENTS

| | | |
|---|---|---|
| DE | 2165567 | 7/1973 |
| DE | 4242150 | 6/1994 |
| GB | 954456 | 4/1964 |

* cited by examiner

Primary Examiner—Lowell A. Larson
(74) Attorney, Agent, or Firm—McCormick, Paulding & Huber LLP

(57) ABSTRACT

A device for producing metal fibers from a metal wire includes a forming assembly and a cutting assembly arranged downstream from the forming assembly in the direction of production. Both the forming assembly and the cutting assembly are driven by a driving mechanism and are mechanically synchronized. The cutting assembly includes a cutting roller and a mating roller, the cutting roller having cutting elements extending radially outwardly from a circumferential surface of the cutting roller and are uniformly distributed over the circumferential surface. The cutting roller and the mating roller are arranged at a minimum distance, one above the other, where either the cutting roller or the mating roller is arranged above a travelling path of the wire, while the other is arranged below the travelling path of the wire. During fiber production, the wire passes substantially tangentially between the cutting roller and the mating roller.

9 Claims, 3 Drawing Sheets

DEVICE FOR PRODUCING METAL FIBERS

FIELD OF THE INVENTION

The present invention relates to a device for producing metal fibers, especially steel fibers to be used in industrial floor, shotcrete, precast or structural applications.

BACKGROUND OF THE INVENTION

Nowadays, the use of metal fibers for reinforcing concrete, especially for reinforcing floor plates having large surfaces, like e.g. industrial floor, or shotcretes, is widely known. These fibers are known in various embodiments. In most cases, such fibers comprise a substantially linear piece of wire with hook-shaped deformations on both ends, whereby the ends can be angularly or circularly deformed. Alternatively, the fibers can have an overall undulated form.

The metal fibers can be produced by forming a metal wire having a suitable thickness into the desired shape and by subsequently cutting pieces of the desired length of said shaped metal wire. Known devices for producing metal fibers accordingly comprise a forming assembly and a cutting assembly arranged in series.

The forming assembly comprises e.g. two oppositely and synchronously rotating forming rollers positioned one above the other, so that their respective outer circumferential surfaces are spaced at a distance substantially equal to the thickness of the metal wire. The circumferential surfaces of the two forming rollers comprise indentations and projections, whereby the projections of the first roller engage in the indentations of the second roller. The cutting assembly comprises e.g. a circular toothed cutter wheel, which cooperates with a fixed cutter block over which the metal wire is fed for shearing off said wire when one of the teeth of said cutter wheel passes in front of said cutter block.

During production, the forming assembly and the cutter assembly are each driven by a separate electric motor. The metal wire passes between the forming rollers, whereby the wire is shaped according to the rotational arrangement of said projections and indentations on the circumferential surfaces of the forming rollers. The shaped wire then passes into the cutter assembly. The electric motors of the forming and the cutting assembly are run synchronously, so that the cutter wheel cuts a fiber each time the appropriate portion of the shape is in a cutting position on the fixed cutter block.

A major disadvantage of such a device consists in the problem of synchronization of the electrical motors of the different assemblies. While synchronization of the motors works well enough at low production speed, problems arise if the production speed is raised above a certain value. This means that in practice, such a device is limited to a production speed below 7 m/s or even below 5 m/s.

The metal wire for producing the metal fibers is produced from wire rod in a dry or wet drawing process. Drawing machines achieve production rates of up to 50 m/s. Due to the limited production speed of the device for producing metal fibers, the drawn metal wire can not be immediately supplied to the device for producing metal fibers. Instead, the drawing machine winds the drawn metal wire onto a wire coil. A plurality of these wire coils are then mounted on an installation comprising several fiber production devices arranged in parallel, where the wire coils are unwound and the respective metal wires are shaped and the fibers are cut in parallel.

It is clear that the handling and the storing of wire coils is very labor-intense and space-consuming which leads to high production costs and hence to reduced productivity.

The object of the present invention is to provide an improved device for producing metal fibers, which allows a higher production speed.

SUMMARY OF THE INVENTION

In order to overcome the above-mentioned problem, the present invention provides a device for producing metal fibers from a metal wire, which comprises a forming assembly and a cutting assembly, said cutting assembly being arranged downstream of said forming assembly in the direction of production, said forming assembly being driven by driving means, wherein said cutting assembly is driven by said driving means and wherein said forming assembly and said cutting assembly are mechanically synchronized.

In the device according to the present invention, the forming assembly and the cutting assembly are driven by the same drive means. The synchronization of the two assemblies is implemented by a mechanical means, i.e. the two assemblies are subjected to a restricted guidance. This means that even at higher production speed, the synchronization is guaranteed and the two assemblies turn at the same velocity. Hence the production speed can be considerably raised compared to state of the art devices. It is thus possible to raise the production speed up to values above 30 m/s, i.e. up to values which are comparable to the production speed of the drawing machine. Accordingly the device for producing metal fibers can be mounted in series to the drawing machine and the drawn wire can be directly supplied from the drawing machine to the fiber-producing device without wasting productivity of the drawing machine. The temporary winding-up of the wire onto wire coils is no longer required and accordingly no more handling and storing of the coils is needed.

With the solution of the present invention, one single fiber-production device equals substantially the productivity of several state of the art devices arranged in parallel. This productivity is achieved without the need of large unwinders for up to ten wire coils. Considering further that no more storage room is needed for temporarily storing the wire coils between their production on the drawing machine and their unwinding in the fiber-production device, the proposed solution saves about 50% of the space needed for the entire installation. Furthermore no more handling of the coils is needed which reduces considerably the expenditure of work for the production of the fibers. It follows that the productivity of a fiber-production installation using a device according to the present invention is considerably increased compared to state of the art installations.

It has to be noted that the fiber-production device according to the present invention can be arranged in a very compact unit that is easily moveable. Hence it is possible at any time to remove the fiber-production device from the wire drawing machine. The wire drawing machine can therefore still be used for any other kind of wire production, e.g. by winding the produced wire onto wire coils for a different application. Furthermore the fiber production device can easily be replaced by an other device in case of excessive wear of the forming or cutting tools or in case that fiber having a different form should be produced.

In a preferred embodiment the device further comprises a feeding assembly, said feeding assembly being arranged upstream of said forming assembly in the direction of production and being driven by said driving means, wherein said feeding assembly and said forming assembly are mechanically synchronized. The feeding assembly preferably comprises at least one frictional roller, around which the drawn wire is winded in one or more wraps. Due to the friction between the roller and the drawn wire wrapped around the roller, the wire is entrained when said roller is rotationally driven. During fiber production, the frictional roller is driven at a predetermined velocity, which determines the rate of feed of the drawn wire. If the feeding assembly comprises two spaced apart frictional rollers connected in series, the drawn wire is preferably wrapped at least once around the outer periphery of the roller assembly. In this case, the straight wire portions between the two frictional rollers can equalize variations in wire tension caused by the preceding drawing machine. It follows that the forming assembly and the cutting assembly are independent from the variation in wire tension caused by the drawing machine.

In an alternative embodiment, the feeding assembly comprises two feeding rollers, which are arranged one above the other at a distance substantially equal to the diameter of the drawn wire. In this embodiment, at least one of the feeding rollers is driven at the required velocity.

The forming assembly and accordingly the cutting assembly are mechanically synchronized to said feeding assembly, so that their respective feeding rates correspond to the feeding rate of the feeding assembly. Neither the forming assembly nor the cutting assembly has to fulfill a feeding function and can hence be optimized for their respective forming or cutting function, resulting in an enhanced smoothness of production. Furthermore the forming assembly and the cutting assembly are independent from the variation in wire tension caused by the drawing machine.

In a preferred embodiment said cutting assembly comprises a cutting roller and a mating roller, said cutting roller comprising cutting elements extending radially outwardly of a circumferential surface of said cutting roller and said cutting elements being uniformly distributed over said circumferential surface. The cutting roller and the mating roller are advantageously arranged at a minimum distance one above the other, wherein one of said cutting roller and said mating roller is arranged above the traveling path of said wire and the other one is arranged below said travelling path. During fiber-production the wire passes substantially tangentially between said cutting and said mating roller, whereby the cutting elements are pressed into the wire and the wire is cut. It has to be noted that compared to the shearing operation of state of the art cutting devices, this cutting roller allows for a much smoother and softer cutting operation that does not disturb the normal feeding movement of the wire. Furthermore noise is considerably reduced.

In a preferred embodiment, at least one of said cutting roller and said mating roller is vertically moveable and the fiber production device comprises means for adjusting the vertical distance between said cutting roller and said mating roller. It is thus possible to adjust the vertical distance between the two rollers of said cutting assembly to the diameter of the wire to be processed. The adjusting means comprises e.g. an adjusting spindle or screw.

In order to adjust the cutting location of the cutting assembly to the accurate portion of the shape of said shaped wire, the cutting assembly is preferably displaceable in the direction of production, so that the distance between said forming assembly and said cutting assembly is adjustable. The cutting assembly can for instance be mounted on a slide, the longitudinal position of which is adjustable by an adjusting spindle. In this way, the location of the cutting position of the cutting tool can be exactly adjusted with respect to the forming assembly, so that the shaped wire is cut exactly in the right position of the shape.

It has to be noted that the mechanical synchronization between the different assemblies can comprise a belt drive and/or a gear drive and/or a chain drive.

The device of the present invention can be operated at production speed values above 30 m/s, i.e. at a production speed, where more than 2000 fibers are produced per second. This means that more than 2000 forming and cutting operations have to be performed per second. In order to raise the tool life of the forming or the cutting assembly at high-speed production, the fiber production device comprises advantageously means for imparting a to-and-fro movement to said wire in said cutting assembly and/or in said forming assembly, said to-and-fro movement in a horizontal direction transverse to a direction of fiber production.

It has to be noted that the diving means of the fiber-production device can be either a separate motor or the motor of the drawing machine. In the latter case, the synchronization of the feeding velocities of the drawing machine and the fiber-production device can be easily achieved by a similar mechanical synchronization. In other words, the fiber production device of the present invention can be advantageously combined with any possible pretreatment machine for the wire, as e.g. a preceding wire drawing machine or a wire rolling mill.

It will further be appreciated, that the device of the present invention can be used to produce fibers having any possible section, i.e. having a circular, oval or flat section.

BRIEF DESCRIPTION OF THE DRAWINGS

The present invention will be more apparent from the following description of a not limiting embodiment with reference to the attached drawings, wherein

FIG. 1 shows schematically a side view of a device 10 for producing metal fibers. This device comprises substantially a feeding assembly 12, a forming assembly 14 and a cutting assembly 16 arranged in a series connection on a single horse 18.

DETAILED DESCRIPTION OF THE PREFERRED EMBODIMENT

Figure 1:
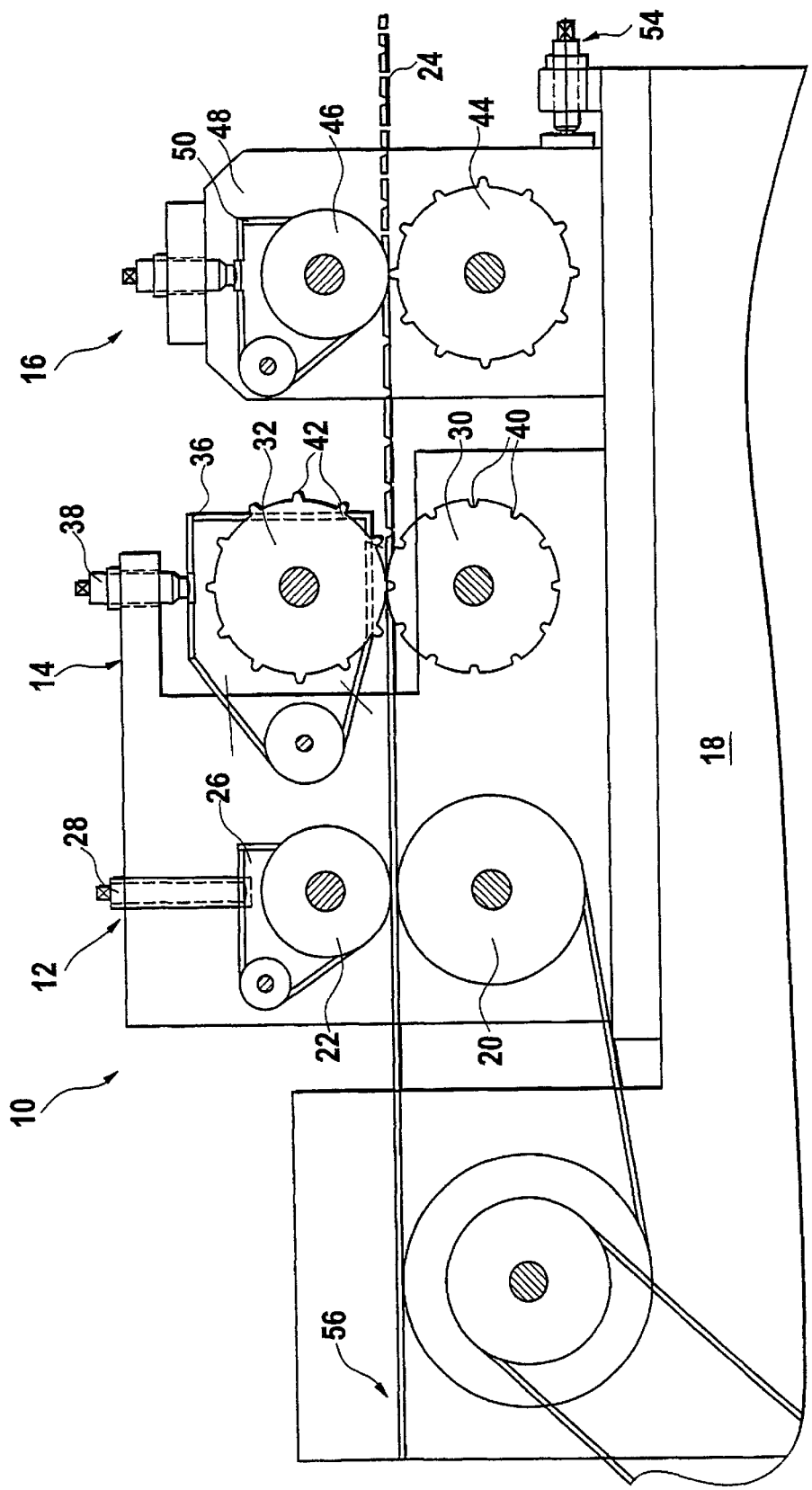
FIG. 1: shows a side view of a first embodiment of a device for producing metal fibers.

In the embodiment shown in FIG. 1, the feeding assembly 12 comprises a pair of feeding rollers 20 and 22, which are mounted in a rack 23 one above the other at a distance corresponding substantially to the diameter of the wire. The first feeding roller is arranged below a traveling path 24 of said wire with its circumferential surface lying tangentially to said traveling path 24. Similarly the second feeding roller 22 is arranged above the traveling path 24 of said wire with its circumferential surface lying tangentially to said traveling path 24. It has to be noted that the second roller 22 is preferably mounted on a pivoting arm 26, which is hingedly mounted on the rack 23 about a substantially horizontal axis. An adjusting mechanism 28 connects the free end of the pivot arm 26 to the rack 23. With this adjusting mechanism, like e.g. an adjusting spindle or screw, the distance between the two feeding rollers 20 and 22 can easily be adjusted to the diameter of the wire to be processed. During fiber production, at least one of the feeding rollers is driven by a driving mechanism at a velocity, which determines the rate of feed of the drawn wire in the fiber-production device.

The forming assembly 14 comprises a pair of forming rollers 30 and 32, which are mounted in the rack 23 one above the other at a distance corresponding substantially to the diameter of the wire. As for the feeding assembly 12, the first forming roller 30 is arranged with its circumferential surface lying tangentially to the traveling path 24 of the wire and the second forming roller 32 is arranged with its circumferential surface lying tangentially to said traveling path 24. The second forming roller 32 is mounted on a pivoting arm 36, which is hingedly mounted on the rack 23 about a substantially horizontal axis. An adjusting mechanism 38 connects the free end of the pivot arm 36 to the rack 23. With this adjusting mechanism, like e.g. an adjusting spindle or screw, the distance between the two forming rollers 30 and 32 can easily be adjusted to the diameter of the wire to be processed. The circumferential surface of the first forming roller 30 comprises indentations 40, which are distributed in a predetermined pattern over the circumferential surface of the roller. The circumferential surface of the second forming roller 32 comprises corresponding projections 42, said projections being similarly distributed over the circumferential surface, so that said projections 42 of said second forming roller 32 engage in the indentations 40 of the first forming roller 30. During fiber production at least one of the forming rollers 30 and 32 is driven so that the two forming rollers rotate in opposite directions. The metal wire passes between the forming rollers, whereby the wire is shaped according to the rotational arrangement of said projections 42 and indentations 40 on the circumferential surfaces of the forming rollers.

The cutting assembly 16 comprises a cutting roller 44 and a mating roller 46, which are mounted in a second rack 48 one above the other at a minimum distance. One of said cuffing roller and said mating roller is arranged above the traveling path 24 of said wire and the other one is arranged below said travelling path 24. The mating roller 46 is preferably mounted on a pivoting arm 50 with adjusting mechanism, so that the distance between the cutting and the mating roller can be easily adjusted. The cutting roller 44 comprises cuffing elements 52 extending radially outwardly of a circumferential surface of said cutting roller 44. These cutting elements are uniformly distributed over said circumferential surface. During fiber-production the wire passes substantially tangentially between said cutting and said mating roller, whereby the cutting elements are pressed into the wire and the wire is cut.

Figure 2:
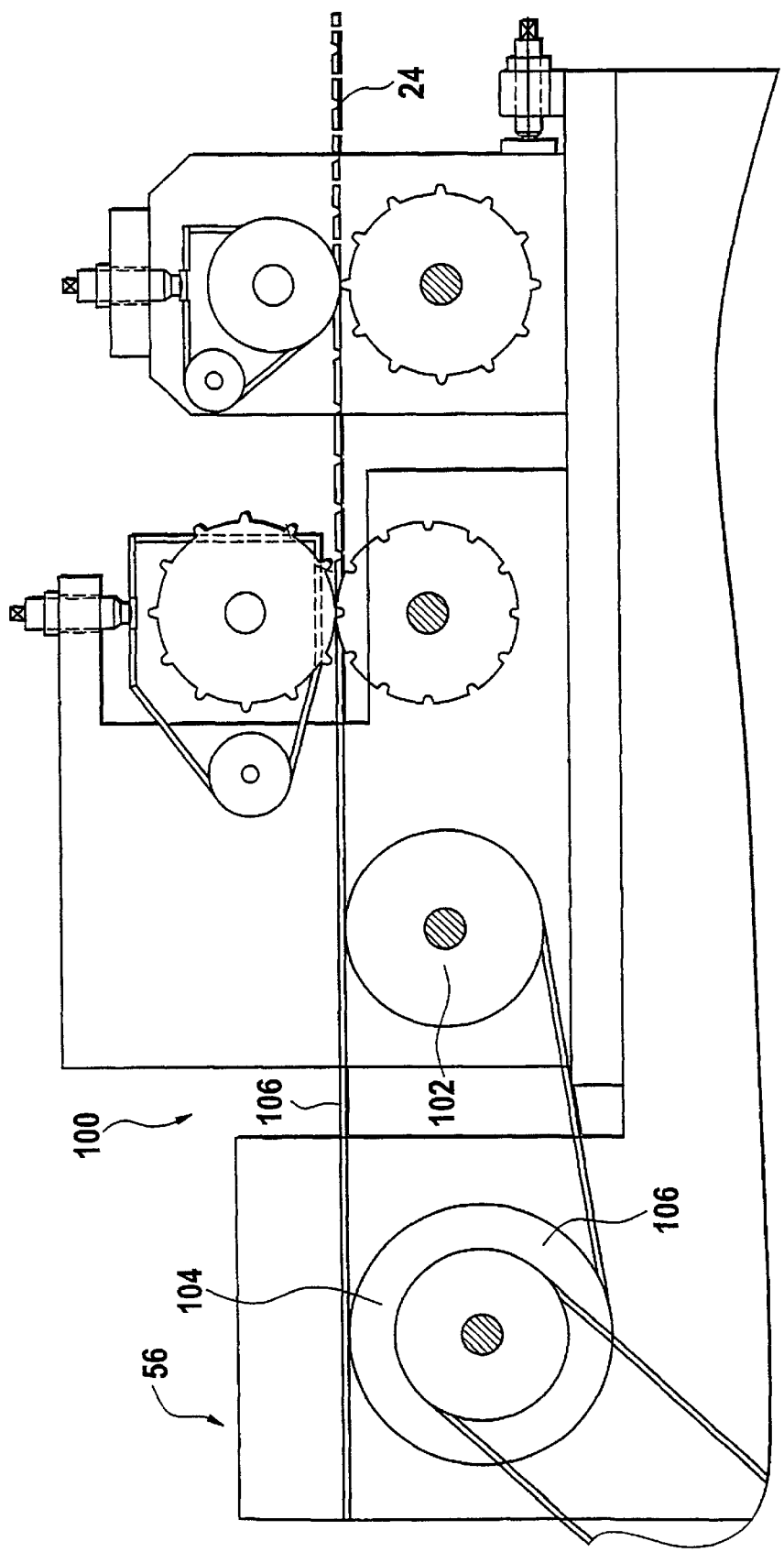
FIG. 2: shows a side view of a second embodiment of a device for producing metal fibers.
Figure 3:
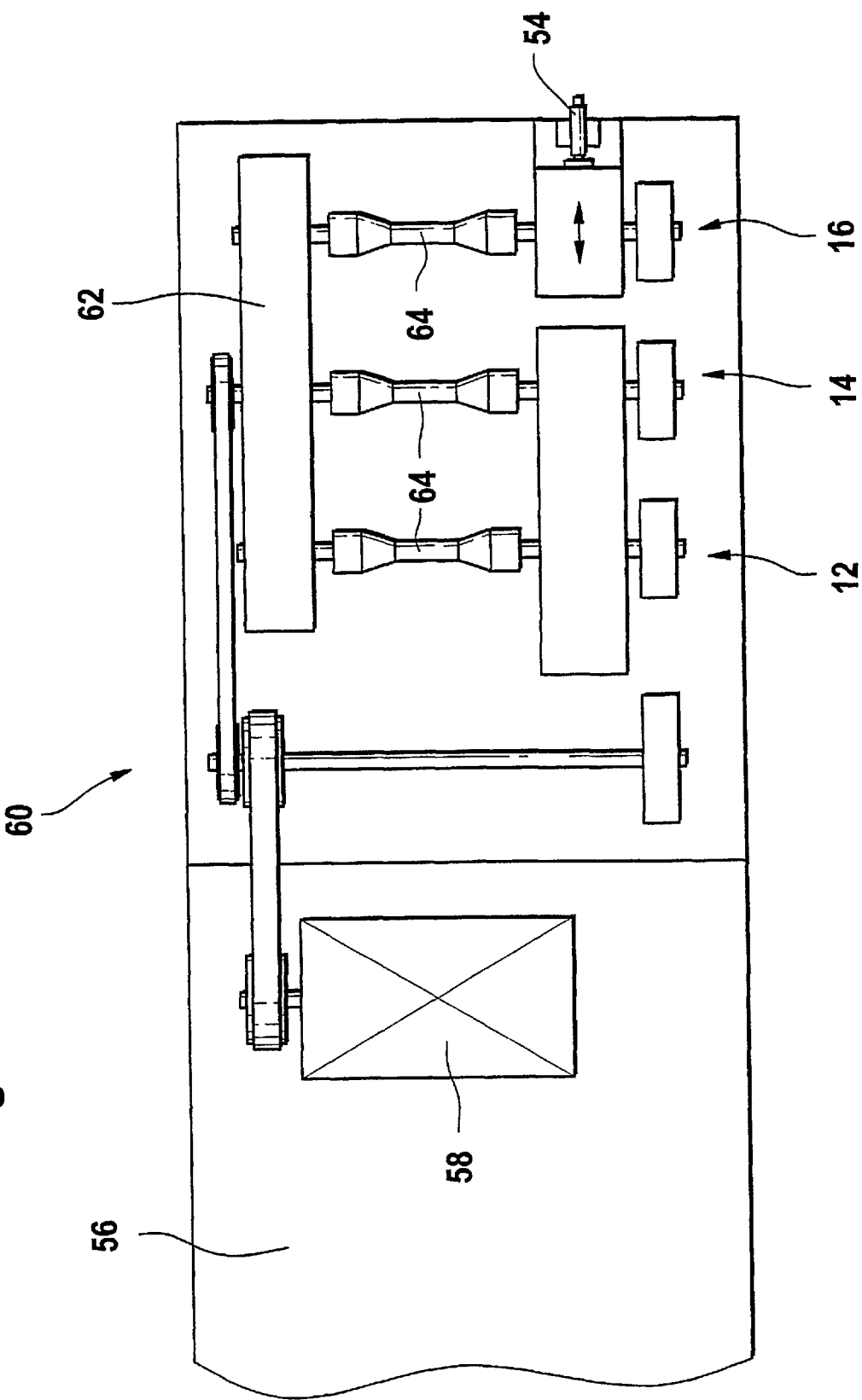
FIG. 3: shows a top view of a device for producing metal fibers together with a drawing machine connected in series to said device.

The second rack 48 is preferably longitudinally displaceable with respect to the first rack 23. A position adjusting mechanism 54, like e.g. an adjusting spindle, connects the second rack 48 to the first rack 32. This adjusting spindle 54 can be used to exactly position the cuffing assembly 16 with respect to the forming assembly 14, so that the shaped wire is cut at the accurate part of its shape. An alternative embodiment of the fiber production device is shown in FIG. 2. This device differs from the device of FIG. 1 essentially by the embodiment of the feeding assembly 100. The feeding assembly 100 comprises a first frictional roller 102 and a second frictional roller 104, which are arranged a certain distance apart in a series connection. In the present embodiment, the frictional roller 102 and 104 are arranged below the traveling path 24 of said wire with their respective circumferential surface lying tangentially to said traveling path 24.

The metal wire, which is produced by a preceding drawing machine (placed on the left side of the fiber producing device), is wound at least once around the frictional rollers 102 and 104.

Due to the friction between the rollers and the drawn wire wrapped around the rollers, the wire is entrained when said rollers are rotationally driven and fed to the succeeding forming and cutting assembly. During fiber production, at least one of the frictional rollers is therefore driven at a predetermined velocity, which determines the rate of feed of the drawn wire.

The winding of the wire on the frictional rollers is preferably realized in such a matter, that the wire is wrapped at least once around the outer periphery of the roller assembly. In this case, the straight wire portions 106 between the two frictional rollers can equalize variations in wire tension caused by the preceding drawing machine. It follows that the forming assembly and the cutting assembly are independent from the variation in wire tension caused by the drawing machine.

The fiber-production device 10 is preferably connected in series with a wire drawing machine 56 for producing the metal wire from wire rod. In this case, the fiber-production device 10 is advantageously driven by the driving means 58 of said drawing machine. This case is represented in FIG. 2. The drawing machine and the fiber-production device 10 are mechanically synchronized, e.g. by a belt drive and/or a gear drive and/or a chain drive 60, so that both devices turn at the same production speed, i.e. wire feeding speed. Similarly, the feeding assembly 12, the forming assembly 14 and the cutting assembly 16 of the fiber-production device 10 are synchronized by similar mechanical synchronization means 62. The transmission ratio between the different assemblies is chosen according to the diameter of the respective driven rollers, so that the tangential speed of the driven rollers of each assembly is substantially the same for each assembly. In the shown embodiment, the rotational movement is then transmitted separately to the respective driven rollers by means of individual cardan shafts 64.

It has to be noted that the feeding assembly 12, the forming assembly 14 and the cutting assembly 16 arranged on the single horse 18 form a very compact unit that is easily moveable. Hence it is possible at any time to remove the fiber-production device from the wire drawing machine. The wire drawing machine can therefore still be used for any other kind of wire production, e.g. by winding the produced wire onto wire coils for a different application. Furthermore the fiber production device can easily be replaced by an other device in case of excessive wear of the forming or cutting tools or in case that fiber having a different form should be produced.

What is claimed is:

1. Device for producing metal fibers from a metal wire, comprising a forming assembly and a cutting assembly, said cutting assembly being arranged downstream of said forming assembly in the direction of production, said forming assembly and said cutting assembly being driven by a common driving means, wherein said forming assembly and said cutting assembly are mechanically synchronized, and wherein said cutting assembly comprises a cutting roller and a mating roller, said cutting roller comprising cutting elements extending radially outwardly of a circumferential surface of said cutting roller and said cutting elements being uniformly distributed over said circumferential surface, said cutting roller and said mating roller being arranged at a minimum distance one above the other with one of said cutting roller and said mating roller being arranged above a traveling path of said wire and the other one being arranged below said traveling path, so that during fiber-production said wire passes substantially tangentially between said cutting roller and said mating roller.

2. Device according to claim 1 further comprising a feeding assembly, said being arranged upstream of said forming assembly in the direction of production and being driven by said driving means, wherein said feeding assembly and said forming assembly are mechanically synchronized.

3. Device according to claim 1 wherein at least one of said cutting roller and said mating roller is vertically moveable, said device further comprising means for adjusting the vertical distance between said cutting roller and said mating roller.

4. Device according to claim 1, wherein said cutting assembly is displaceable in the direction of production, so that the distance between said forming assembly and said cutting assembly is adjustable.

5. Device according to claim 1, wherein the mechanical synchronization comprises a belt drive and/or a gear drive and/or a chain drive.

6. Device according to claim 1 further comprising means for imparting a to-and-fro movement to said wire in said cutting assembly, said to-and-fro movement in a horizontal direction transverse to a direction of fiber production.

7. Device according to claim 1 wherein said device is formed as a compact and moveable unit.

8. Device according to claim 1 wherein the driving means is a motor of a drawing machine connected in series to said device.

9. Device according to claim 1, further comprising means for imparting a to-and-fro movement to said wire in said forming assembly, said to-and-fro movement in a horizontal direction transverse to a direction of fiber production.

* * * * *

UNITED STATES PATENT AND TRADEMARK OFFICE
CERTIFICATE OF CORRECTION

PATENT NO. : 6,748,781 B2  
DATED : June 15, 2004  
INVENTOR(S) : Fernand Felgen It is certified that error appears in the above-identified patent and that said Letters Patent is hereby corrected as shown below:

Column 7,  
Line 2, after the first "said", please insert -- feeding assembly --.

Signed and Sealed this

Twenty-fourth Day of August, 2004

JON W. DUDAS  
*Director of the United States Patent and Trademark Office*

UNITED STATES PATENT AND TRADEMARK OFFICE
CERTIFICATE OF CORRECTION

PATENT NO.     : 6,748,781 B2
DATED          : June 15, 2004
INVENTOR(S)    : Fernand Felgen It is certified that error appears in the above-identified patent and that said Letters Patent is hereby corrected as shown below:

<u>Title page,</u>
Item [73], Assignee, should be as follows:

-- Trefilarbed Bissen S.A. --

Signed and Sealed this

Twenty-eighth Day of September, 2004

JON W. DUDAS
*Director of the United States Patent and Trademark Office*